(12) United States Patent
Porras et al.

(10) Patent No.: US 7,000,964 B1
(45) Date of Patent: *Feb. 21, 2006

(54) VACUUM FLOW SUCTION CUP ASSEMBLY

(75) Inventors: Chris Porras, Chesterfield, VA (US); Geoff Parnell, Midlothian, VA (US); Paul Boyd, Midlothian, VA (US); Lee Robinson, Ruther Glen, VA (US)

(73) Assignee: Bakery Holdings LLC, Richmond, VA (US)

( * ) Notice: Subject to any disclaimer, the term of this patent is extended or adjusted under 35 U.S.C. 154(b) by 20 days.

This patent is subject to a terminal disclaimer.

(21) Appl. No.: 10/814,920

(22) Filed: Mar. 31, 2004

(51) Int. Cl.
*B25J 15/06* (2006.01)
(52) U.S. Cl. ........................................ 294/64.1; 294/65
(58) Field of Classification Search ............... 294/64.1, 294/65; 414/627, 737, 752.1; 901/40
See application file for complete search history.

(56) References Cited

U.S. PATENT DOCUMENTS

| | | | |
|---|---|---|---|
| 3,558,171 A | * | 1/1971 | Netsch et al. ............... 294/64.1 |
| 4,078,671 A | * | 3/1978 | Lundstrom ................... 414/627 |
| 4,787,812 A | * | 11/1988 | Gopfert ....................... 414/737 |
| 6,502,808 B1 | * | 1/2003 | Stone et al. .................. 269/21 |

* cited by examiner

*Primary Examiner*—Dean J. Kramer

(57) ABSTRACT

A contact activated vacuum assisted suction cup assembly comprising: 1) a cylindrical bellowed or corrugated cup defining a plurality of interconnected bellows or corrugations of alternating, coaxial large and small diameter areas, hereinafter "bellows", and having; A) an open contact end; and B) a valve end including a valve seat; 2) a valve stem having first and second extremities; 3) a valve plate intermediate the open contact end and the valve end in one of the large diameter areas attached to the first extremity; and 4) a valve stop attached to the valve stem at the second extremity that can engage the valve seat in the closed position. A picking device comprising a vacuum plenum having a plurality of the previously described contact activated vacuum assisted suction cup assemblies mounted therein in plenum apertures that engage a peripheral flange about the valve end is also described.

11 Claims, 3 Drawing Sheets

VACUUM FLOW SUCTION CUP ASSEMBLY

FIELD OF THE INVENTION

The present invention relates to vacuum assisted suction cups and more particularly to such devices that are used in combination with vacuum plenums to pick up and move individual units in, for example, a packaging operation.

BACKGROUND OF THE INVENTION

In the packaging and other similar industries where it is desired to pick up (in the idiom of the industry "pick") a unit, for example a loaf of bread, a manufactured part or assembly etc., vacuum assisted suction devices are commonly used. Such devices generally and commonly comprise a large vacuum plenum with many vacuum assisted suction cups, i.e. cup shaped devices to which a vacuum is applied from the interior of the plenum, attached thereto. With such an arrangement, there is always a loss of vacuum from through any suction cup that does not engage a product being picked. If the object or objects being picked do not cover all of the vacuum assisted suction cups from a single plenum, then leakage due to the uncovered suction cups will cause a reduction of the vacuum inside of the plenum and the object or objects that are to be picked may not be exposed to adequate vacuum to permit their picking. Thus, problems arise when the objects to be picked do not cover all of the suction cups or when multiple products need to be lifted by a single plenum having a multitude of suction cups.

Several methods have been suggested to solve this problem. The traditional method is to section off the plenum or end effector into multiple chambers each with its own individual vacuum source. Objects can then be picked one at a time since each of the products or objects can be lifted by a vacuum produced by its own discrete "plenum". An alternative conventional solution to solve this problem where all but a few suction cups are covered by the object to be picked is to increase the vacuum level to compensate for leakage.

As is apparent to the skilled artisan, when the foregoing solution of "chambering" the vacuum plenum to accept a particular vacuum assisted suction cup configuration for a particular product or set of products is implemented, a product change inevitably requires a plenum chambering reconfiguration to insure proper picking of the newly introduced product or product array. Such a reconfiguration is time consuming and expensive in terms of manpower and downtime.

From the foregoing, it is apparent that there currently exists a problem with the ability of conventionally designed vacuum assisted suction cup picking systems as it relates to their ability to accept product configurations that either do not cover all of the suction cups of a particular suction cup configuration, or to adapt to product handling changes.

OBJECTS OF THE INVENTION

It is therefore an object of the present invention to provide a contact activated, vacuum assisted suction cup assembly that automatically and without human intervention adapts to a wide variety of product configurations.

It is another object of the present invention to provide a contact activated, vacuum assisted suction cup assembly that permits implementation of a vacuum-based suction cup picking system that automatically and without human intervention adapts to a wide variety of product configurations.

SUMMARY OF THE INVENTION

According to the present invention there is provided a contact activated vacuum assisted suction cup assembly comprising: 1) a cylindrical bellowed or corrugated cup defining a plurality of interconnected bellows or corrugations of alternating, coaxial large and small diameter areas, hereinafter "bellows", said bellowed cup having; A) an open contact end; and B) a valve end including a valve seat; 2) a valve stem having first and second extremities; 3) a valve plate intermediate the open contact end and the valve end in one of said large diameter areas attached to the first extremity; and 4) a valve stop attached to the valve stem at the second extremity. A picking system comprising a vacuum plenum having a plurality of the previously described contact activated vacuum assisted suction cup assemblies mounted therein in valve apertures in the plenum that engage the valve seats is also described.

DETAILED DESCRIPTION

Figure 1:
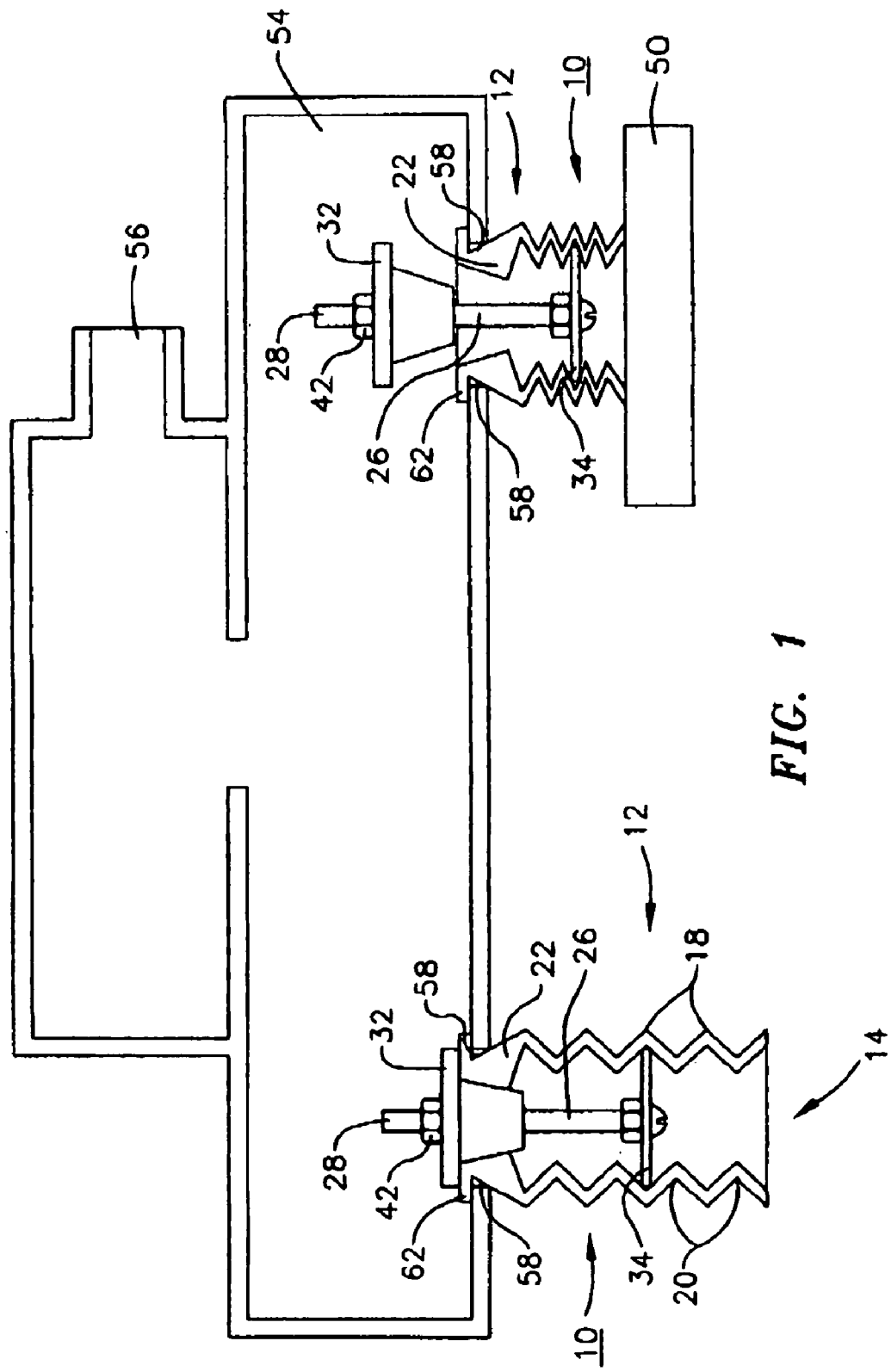
FIG. 1 is a schematic partially cut-away side view of a portion of a picking system in accordance with the present invention showing the structure of the contact activated vacuum assisted suction cup assembly of the present invention in each of the open and closed positions.

Referring now to FIGS. 1 and 3–6, the contact activated vacuum assisted suction cup assembly 10 of the present invention comprises a corrugated or bellowed cup 12 comprising an open end 14 and a valve end 16. Corrugated cup 12 further includes coaxial large diameter areas 18 and small diameter areas 20 defined by the interconnected corrugations or "bellowed" configuration of bellowed cup 12.

At the valve end 16 of bellowed cup 12 is a valve seat 22 (best seen in FIGS. 1 and 3) that closes valve end 16 except at the aperture 24 in valve seat 22. Valve end 12 also incorporates a peripheral and preferably integral flange 62 whose purpose is the engagement of apertures in a plenum 54 as described below.

Figure 6:
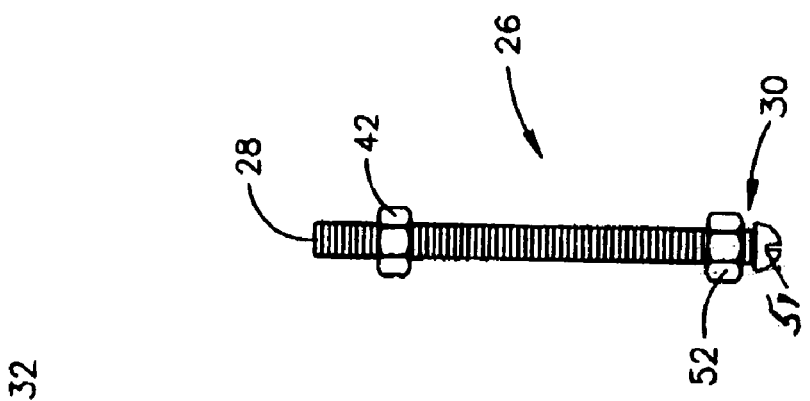
FIG. 6 is a side view of one embodiment of the valve stem portion of the contact activated vacuum assisted suction cup assembly of the present invention.

Inserted through aperture 24 is valve stem 26 (best seen in FIGS. 1 and 6). As depicted on the attached drawings, valve stem 26 comprises a simple bolt, however it will be readily appreciated that more sophisticated custom machined, welded etc. structures could be substituted for this simple design. Valve stem 26 has a first extremity 28 and a second extremity 30. Attached to first extremity 28 in the accompanying Figures is a valve stop 32 (best seen in FIGS. 1 and 5) and attached to the second extremity 30 is a valve plate 34 (best seen in FIGS. 1 and 4). Attachment of valve stop 32 to valve stem 26 is accomplished by the simple expedient of inserting valve stem 26 through aperture 36 in valve stop 32. Valve stop 32 may be located on valve stem 26 by, for example providing threads 40 on the inner surface 38 of valve stop 32 as shown, or by simply securing valve stop 32 with a nut 42 on both the upper and lower surfaces 44 and 46 of valve stop 32. In the embodiment depicted in the accompanying Figures, valve stop 32 is threaded onto valve stem 26 and nut 42 is used to secure it in position. Quite obviously, valve seat 22 and valve stop 32 must be of relative sizes as to seal aperture 24 when valve assembly 10 is in the closed position depicted at the left in FIG. 1.

As will be apparent to the skilled artisan, valve stop 32 and valve seat 22 should be fabricated from a material or materials that allow for tight sealing therebetween upon contact of these two elements of the assembly of the present invention as shown at the left in FIG. 1. Thus, rubber or polymeric materials that provide such sealing should be used. Alternatively, a coating of a suitable such material can be applied over a "non-sealing" metallic or polymeric structure to provide the appropriate sealing effect.

At the opposing extremity of valve stem 26, valve plate 34 is attached to valve stem 26 by the insertion of valve stem 26 through aperture 48 at the approximate center of valve plate 34 and securing it in position between the head 51 of valve stem 26 with nut 52. As best seen in FIG. 1, valve plate 34 is of a diameter D (see FIG. 4) that is of approximately the same as or slightly larger than diameter D' of large diameter areas 18 (see FIG. 1) so that it can be inserted into one of large diameter areas 18 intermediate valve end 16 and open end 14. In this configuration, valve plate 34 will remain in position in corrugated cup 12 even when an individual assembly 10 is not in use. Apertures 35 are provided in valve plate 34 to permit a vacuum to be drawn through valve plate 34 prior to and upon contact of open end 14 with an object to be lifted 50 as explained more fully below.

While valve stop 32 and valve plate 34 are described herein as being located at "the extremities" 28 and 20 of valve stem 26, it will be apparent to the skilled artisan that the term extremity as used in this context is meant to indicate at or near the opposing ends of valve stem 26 and not necessarily at the very end thereof.

Figure 5:
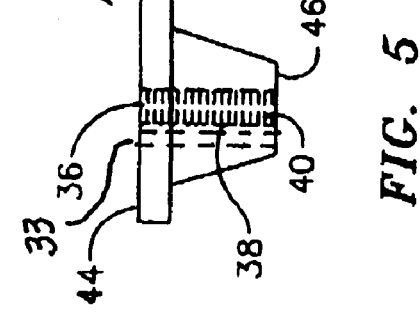
FIG. 5 is a partially phantom side view of the valve stop portion of the contact activated vacuum assisted suction cup assembly of the present invention.
Figure 4:
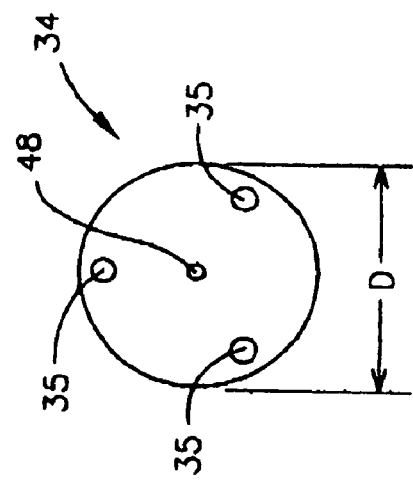
FIG. 4 is a top view of the valve plate portion of the contact activated vacuum assisted suction cup assembly of the present invention.
Figure 3:
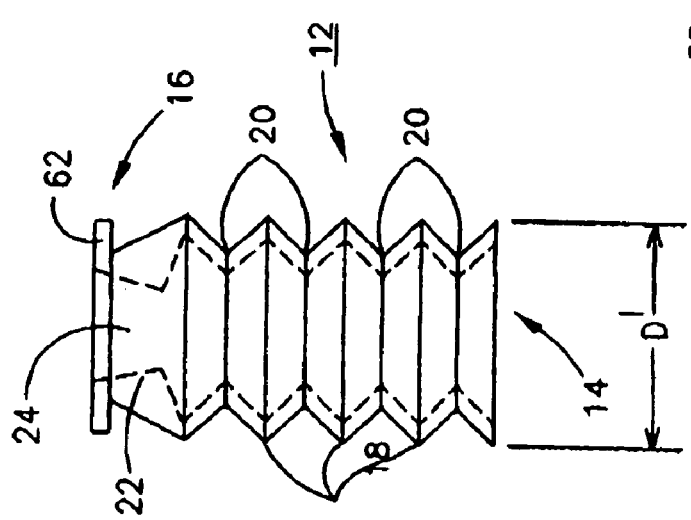
FIG. 3 is a partially phantom side view of the suction cup portion of the contact activated vacuum assisted suction cup assembly of the present invention.

Depicted schematically in FIG. 1, is a plenum 54 having a vacuum inlet 56. Apertures 58 in plenum 54 engage valve end 16 of corrugated cup 12 through the engagement of peripheral flange 62 with the periphery of aperture 58. As shown at the left of FIG. 1, when no object to be lifted is present, corrugated cup 12 remains in its fully extended position, valve stem 26 with attached valve stop 32 remains in its fully lowered position, valve stop 32 engages valve seat 22 and no vacuum can pass through valve end 16. Thus, if no product 50 contacts open end 14, no vacuum is allowed to escape through the vacuum cup assembly 10 of the present invention and only those assemblies 10 whose open ends 14 are contacted by product 50 are activated as described below. Upon contact of open end 14 with an object to be lifted 50, corrugated cup 12 collapses upward as shown at the right of FIG. 1 due to any even very slight upward pressure applied to open end 14 against object 50 by downward movement of plenum 54, or if desired by design, upward movement of product 50. In the case depicted at the right, upon the application of upward pressure to corrugated cup 12 (for the reason just described), valve stem 26 is also caused to travel upward resulting in the disengagement of attached valve stop 32 with valve seat 22 thereby allowing vacuum from plenum 54 to pass through apertures 35 to tighten the "grip" of corrugated cup 12 on object 50. As an alternative, a small aperture 33, as shown in FIG. 5, (relative to the area of opening 14) could be provided in valve stop 32 so that a slight vacuum is drawn inside of corrugated cup 12 at all times. In this case, the mere contact of object 50 with opening 14 draws these two elements together due to the slight vacuum being continuously applied inside of corrugated cup 12, resulting, as the vacuum from plenum 54 grows in corrugated cup 12, suitable displacement of valve stem 26 and associated valve stop 32.

It is important to note that when vacuum is applied inside of plenum 54 there is an upward force applied to valve stop 32 proportional to the relatively small cross sectional area of the of the diameter of valve stop 32 as compared to the area of the overall system. The force holding valve stem 26 and associated valve stop 32 down is the force exerted by the spring action of the corrugated cup. The downward spring force maintained by the corrugated cup contacting plate 34 must be greater than the upward force being applied by the vacuum inside of plenum 54 to allow valve stop 32 to remain properly seated. Thus, when an object 50 contacts opening 14 it forces corrugated cup 12 to collapse slightly upward which allows a little vacuum to flow through valve stop 32 and into corrugated cup 12. A, for example, coil spring mounted about valve stem 26 between valve stop 32 and valve plate 34 may be applied if additional downward spring force is required. Alternatively, as alluded to above, an upward force from object 50 may not be required if a small trickle of vacuum is allowed about or through valve stop 32 at all times. This small vacuum, however introduced (through a tiny aperture in valve stop 32 or otherwise) creates a "continuous" very slight vacuum inside of corrugated cup 12 and this vacuum coupled with the relatively large area of opening or aperture 14 creates a large vacuum force upward upon sealing of aperture 14 by an object 50. This relatively large vacuum quickly overcomes the "spring" effect produced by the engagement of plate 34 with area 18, thereby allowing for picking of object 50.

Figure 2:
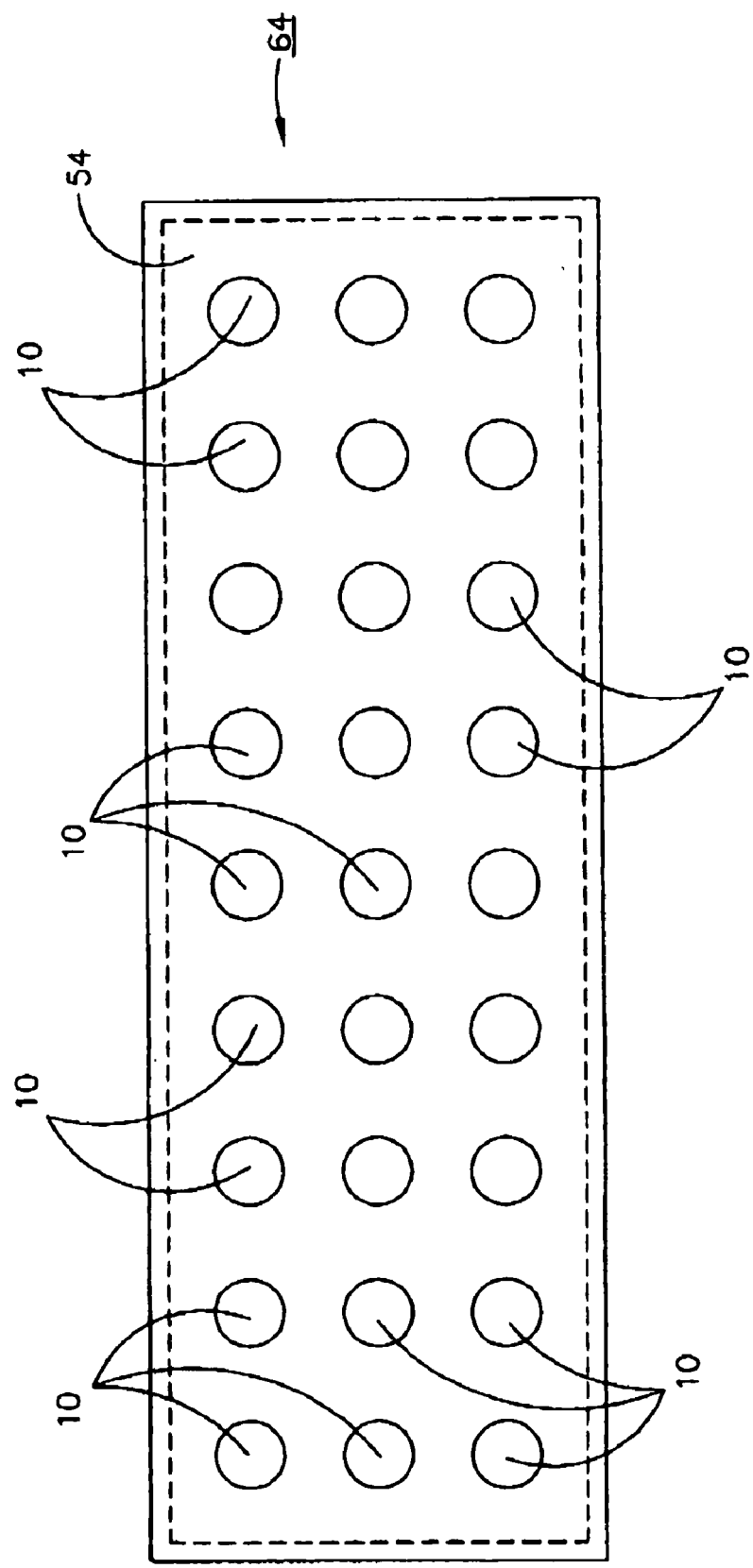
FIG. 2 is a schematic view of a picking system in accordance with the present invention.

Depicted schematically in FIG. 2 is a bottom view of a picking device 64 comprising a plenum 54 having an array of contact activated vacuum assisted suction cup assemblies 10 mounted therein. As just described, such a picking device 64 can be used to pick up and move any arrangement of sizes of objects to be lifted 50 without concern for which of the individual contact activated vacuum assisted suction cup assemblies 10 lies in registration therewith, since those assemblies not in contact with one or more of contact activated vacuum assisted suction cup assemblies 10 will not result in the leakage or loss of vacuum due to the closed condition of valve end 16. Thus the need to add "chambering" or refitting of the picking array is obviated.

There has thus been described a contact activated vacuum assisted suction cup assembly that can readily be fitted to a plenum to provide a picking device that can be used to pick up and move objects of virtually any shape and in any combination of shapes without the need for any custom configuration or design of a picking device into which it is incorporated. There has also been described a picking device comprising a vacuum plenum having an array of such contact activated vacuum assisted suction cup assemblies mounted therein for lifting or picking objects of different shapes or configurations.

As the invention has been described, it will be apparent to those skilled in the art that the same may be varied in many ways without departing from the intended spirit and scope of the invention, and any and all such modifications are intended to be included within the scope of the appended claims.

What is claimed is:

1. A contact activated vacuum assisted suction cup assembly comprising:
1) a cylindrical bellowed or corrugated cup defining a plurality of interconnected bellows or corrugations of alternating, coaxial large and small diameter areas, said bellowed cup having;
C) an open contact end; and
D) a valve end including a valve seat;
2) a centrally located valve stem having first and second extremities;
3) a valve plate intermediate said open contact end and said valve end in one of said large diameter areas attached to said first extremity; and
4) a valve stop attached to said valve stem at said second extremity said valve stop being of a size to engage said valve seat and further including a relatively small aperture in said valve stop for the admission of a slight vacuum into said cylindrical bellowed or corrugated cup.

2. The contact activated vacuum assisted suction cup assembly of claim 1 wherein said valve plate includes apertures therein for the passage of a vacuum.

3. The contact activated vacuum assisted suction cup assembly of claim 2 wherein said valve stop includes a central threaded aperture, said valve stem is threaded and said valve stop is threaded onto said valve stem.

4. The contact activated vacuum assisted suction cup assembly of claim 2 wherein said valve end includes a peripheral flange about said valve end.

5. The contact activated vacuum assisted suction cup assembly of claim 4 wherein said peripheral flange is integral with said valve end.

6. A picking device comprising:
A) a vacuum plenum fed by a vacuum inlet;
B) a plurality of plenum apertures in said vacuum plenum; and
C) in said plenum apertures, contact activated vacuum assisted suction cup assemblies comprising:
i) a cylindrical bellowed or corrugated cup defining a plurality of interconnected bellows or corrugations of alternating, coaxial large and small diameter areas, said bellowed cup comprising;
a) an open contact end; and
b) a valve end including a valve seat and a peripheral flange for engagement with said plenum apertures;
iv) a centrally located valve stem having first and second extremities;
v) a valve plate intermediate said open contact end and said valve end in one of said large diameter areas attached to said first extremity; and
iv) a valve stop attached to said valve stem at said second extremity said valve stop being of a size to engage said valve seat and further including a relatively small aperture in said valve stop for the admission of a slight vacuum into said cylindrical bellowed or corrugated cup.

7. The picking device of claim 6 wherein said valve plate includes apertures therein for the passage of a vacuum.

8. The picking device of claim 7 wherein said valve stop includes a central threaded aperture, said valve stem is threaded and said valve stop is threaded onto said valve stem.

9. The contact activated vacuum assisted suction cup assembly of claim 8 wherein said peripheral flange is integral with said valve end.

10. A contact activated vacuum assisted suction cup assembly comprising:
1) a cylindrical bellowed or corrugated cup defining a plurality of interconnected bellows or corrugations of alternating, coaxial large and small diameter areas, said bellowed cup having;
A) an open contact end; and
B) a valve end including a valve seat;
2) a centrally located valve stem having first and second extremities;
3) a valve plate intermediate said open contact end and said valve end in one of said large diameter areas attached to said first extremity includes apertures therein for the passage of a vacuum; and
4) a valve stop including a central threaded aperture, said valve stem being threaded and said valve stop being threaded onto said valve stem at said second extremity, said valve stop being of a size to engage said valve seat.

11. A picking device comprising:
A) a vacuum plenum fed by a vacuum inlet;
B) a plurality of plenum apertures in said vacuum plenum; and
C) in said plenum apertures, contact activated vacuum assisted suction cup assemblies comprising:
i) a cylindrical bellowed or corrugated cup defining a plurality of interconnected bellows or corrugations of alternating, coaxial large and small diameter areas, said bellowed cup comprising;
ii) an open contact end; and
iii) a valve end including a valve seat and a peripheral flange for engagement with said plenum apertures;
ii) a centrally located valve stem having first and second extremities;
iii) a valve plate intermediate said open contact end and said valve end in one of said large diameter areas attached to said first extremity and including apertures therein for the passage of a vacuum; and
iv) a valve stop including a central threaded aperture, said valve stem being threaded and said valve stop being threaded onto said valve stem at said second extremity, said valve stop being of a size to engage said valve seat.

* * * * *